(12) United States Patent
Hiwata et al.

(10) Patent No.: US 9,383,123 B2
(45) Date of Patent: Jul. 5, 2016

(54) REFRIGERATION CYCLE DEVICE CAPABLE OF EFFICIENTLY VARYING CAPACITY PROVIDING A FIRST AND A SECOND COMPRESSING MECHANISM DISPOSED IN A HERMETIC CONTAINER

(75) Inventors: Akira Hiwata, Shiga (JP); Takeshi Ogata, Osaka (JP); Kentaro Shii, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 143 days.

(21) Appl. No.: 14/116,950

(22) PCT Filed: May 8, 2012

(86) PCT No.: PCT/JP2012/003006
§ 371 (c)(1),
(2), (4) Date: Nov. 11, 2013

(87) PCT Pub. No.: WO2012/153521
PCT Pub. Date: Nov. 15, 2012

(65) Prior Publication Data
US 2014/0090413 A1    Apr. 3, 2014

(30) Foreign Application Priority Data

May 10, 2011   (JP) .................. 2011-104984

(51) Int. Cl.
| F25B 1/00 | (2006.01) |
| F25B 49/00 | (2006.01) |
| F25B 1/10 | (2006.01) |
| F04C 29/12 | (2006.01) |
| F04C 23/00 | (2006.01) |
| F04C 28/26 | (2006.01) |

(Continued)

(52) U.S. Cl.
CPC ............... *F25B 1/10* (2013.01); *F04C 23/001* (2013.01); *F04C 23/008* (2013.01); *F04C 28/26* (2013.01);

(Continued)

(58) Field of Classification Search
CPC ...... F04C 23/001; F04C 23/008; F04C 28/26; F04C 29/026; F04C 18/3564; F04C 29/12; Y02B 30/741; F25B 1/10; F25B 49/022; F25B 2400/074; F25B 2400/0751; F25B 2600/021
USPC ....................................... 62/228.4
See application file for complete search history.

(56) References Cited

U.S. PATENT DOCUMENTS 7,641,454 B2 *   1/2010   Ueda et al. ................ 418/11
7,704,060 B2 *   4/2010   Morimoto et al. ........... 418/11
(Continued)

FOREIGN PATENT DOCUMENTS

JP    59-150991    8/1984
JP    1-193089     8/1989
(Continued)

OTHER PUBLICATIONS

Office Action issued Aug. 17, 2015 in corresponding Chinese patent application and English translation thereof, 8 pages total.
(Continued)

*Primary Examiner* — Allen Flanigan
*Assistant Examiner* — Filip Zec
(74) *Attorney, Agent, or Firm* — Hamre, Schumann, Mueller & Larson, P.C.

(57) ABSTRACT

The present invention provides a capacity-control refrigeration cycle device capable of efficiently vary capacity, and in any of a full operation mode in which capacity of the refrigeration cycle device is not controlled and an operation mode in which the capacity is controlled, all of refrigerants are discharged into a hermetic container 1 and then, the refrigerants pass through a discharge path 11 and are guided to outside of the hermetic container 1. After a refrigerant and oil are sufficiently separated in the hermetic container 1, the refrigerant is discharged to outside of the hermetic container 1. Therefore, efficiencies of a condenser 300 and an evaporator 600 are not deteriorated. Since it is possible to reduce an amount of oil taken outside of the hermetic container, it is possible to stably secure oil in an oil reservoir 22, and to prevent bite of parts of a compressing mechanism and to prevent abnormal wearing.

5 Claims, 4 Drawing Sheets

(51) Int. Cl.
    *F04C 29/02* (2006.01)
    *F25B 49/02* (2006.01)
    *F04C 18/356* (2006.01)

(52) U.S. Cl.
    CPC ............... *F04C 29/026* (2013.01); *F04C 29/12* (2013.01); *F25B 49/022* (2013.01); *F04C 18/3564* (2013.01); *F25B 2400/074* (2013.01); *F25B 2400/0751* (2013.01); *F25B 2600/021* (2013.01); *Y02B 30/741* (2013.01)

(56) References Cited

U.S. PATENT DOCUMENTS 8,985,984 B2 * 3/2015 Ogata et al. ................... 418/268
8,985,985 B2 * 3/2015 Ogata et al. ................... 418/268
2009/0087321 A1 * 4/2009 Morozumi et al. ........... 417/247
2010/0111737 A1 5/2010 Higashi et al.
2011/0271699 A1 11/2011 Lee

FOREIGN PATENT DOCUMENTS

| JP | 4-20751 | 1/1992 |
| JP | 5-24990 | 4/1993 |
| JP | 11-230072 | 8/1999 |
| JP | 2008-175111 | 7/2008 |
| WO | 2010/056002 | 5/2010 |

OTHER PUBLICATIONS

Search Report dated Aug. 7, 2014 from corresponding Chinese patent application and English translation thereof, 4 pages total.

* cited by examiner

REFRIGERATION CYCLE DEVICE CAPABLE OF EFFICIENTLY VARYING CAPACITY PROVIDING A FIRST AND A SECOND COMPRESSING MECHANISM DISPOSED IN A HERMETIC CONTAINER

TECHNICAL FIELD

The present invention relates to a refrigeration cycle device which varies capacity efficiently.

BACKGROUND TECHNIQUE

FIG. 4 shows a configuration of a conventional refrigeration cycle device described in patent document 1.

A hermetic type compressor 801 includes a main compressing element 802 and an auxiliary compressing element 803. A main compressing element discharging pipe 804 and an auxiliary compressing element discharging pipe 805 merge with each other and become a high pressure gas pipe 806. The refrigeration cycle device includes a condenser 807, a high pressure liquid pipe 808, a decompressor 809, an evaporator 810 and a low pressure gas pipe 811. The low pressure gas pipe 811 connects the compressor 801 and the evaporator 810 to each other. The low pressure gas pipe 811 bifurcates into a main compressing element suction pipe 812 and an auxiliary compressing element suction pipe 813. The auxiliary compressing element discharging pipe 805 is provided with a high pressure-side check valve 814. The main compressing element suction pipe 812 is provided with a low pressure-side check valve 815. The bypass pipe 816 connects, to each other, the low pressure-side check valve 815 on the side of the main compressing element 802 and the auxiliary compressing element 803 on the side of the high pressure-side check valve 814. The bypass pipe 816 is provided with a bypass control two-way valve 817 for flowing a refrigerant when capacity is controlled.

Operation of a refrigeration cycle at the time of full operation (at the time of the high capacity mode of compressor) in which capacity is not controlled will be described.

At the time of full operation, the bypass control two-way valve 817 is closed. The compressor 801 is operated, refrigerants which respectively come out from the compressing elements 802 and 803 respectively pass through the discharging pipes 804 and 805 and merge with each other in the high pressure gas pipe 806, and flow to the condenser 807, the decompressor 809 and the evaporator 810. The refrigerant which comes out from the evaporator 810 passes through the low pressure gas pipe 811, a portion of the refrigerant is sucked into the main compressing element 802 through the low pressure-side check valve 815 and the main compressing element suction pipe 812, and another portion of the refrigerant is sucked into the auxiliary compressing element 803 through the auxiliary compressing element suction pipe 813.

Operation of the refrigeration cycle when a load becomes small and capacity is controlled (at the time of low capacity mode of compressor) will be described.

When capacity is controlled, the bypass control two-way valve 817 is opened. The compressor 801 is operated, and a refrigerant which comes out from the auxiliary compressing element 803 passes through the bypass pipe 816 and the bypass control two-way valve 817 and is guided into the main compressing element suction pipe 812. At this time, the auxiliary compressing element suction pipe 813 becomes a suction side of the auxiliary compressing element 803, and the main compressing element suction pipe 812 becomes a discharge side of the auxiliary compressing element 803. Therefore, since a pressure in the main compressing element suction pipe 812 becomes higher than that in the auxiliary compressing element suction pipe 813, the low pressure-side check valve 815 is brought into a closed state. Therefore, refrigerant gas does not flow from the low pressure gas pipe 811 to the main compressing element suction pipe 812. Only a refrigerant which passes through the bypass pipe 816 and is guided into the main compressing element suction pipe 812 is sucked into the main compressing element 802.

A refrigerant flows from the auxiliary compressing element 803 into the main compressing element 802, the refrigerant is discharged from the main compressing element discharging pipe 804, and flows to the high pressure gas pipe 806, the condenser 807, the decompressor 809 and the evaporator 810 in this order, and returns from the auxiliary compressing element suction pipe 813 to the auxiliary compressing element 803.

The bypass pipe 816 becomes the suction side of the main compressing element 802 and the high pressure gas pipe 806 becomes the discharge side of the main compressing element 802. Therefore, a pressure in the high pressure gas pipe 806 becomes higher than that in the bypass pipe 816. Hence, the high pressure-side check valve 814 is brought into a closed state. Therefore, a refrigerant which comes out from the auxiliary compressing element 803 does not flow to the auxiliary compressing element discharging pipe 805.

As described above, when capacity is controlled (at the time of low capacity mode of compressor), the auxiliary compressing element 803 and the main compressing element 802 are connected to each other in series. Usually, when the two compressing elements 802 and 803 are connected to each other in series, it is preferable from the aspect of efficiency that theoretical suction capacity of a high pressure-side compressing element (compressing element corresponding to main compressing element 802 in FIG. 4) is set smaller than theoretical suction capacity of a low pressure-side compressing element (compressing element corresponding to auxiliary compressing element 803 in FIG. 4), and compressing operation is carried out in two stages so that a compression ratio on the low pressure-side and a compression ratio on the high pressure-side become equal to each other.

When it is desired to set capacity control ratio large, i.e., it is desired to set minimum ability small, if theoretical suction capacity on the low pressure-side is set smaller than theoretical suction capacity on the high pressure-side, since compressor ability in serial operation of the compressing element 802 is determined by theoretical suction capacity on the low pressure-side, its object is achieved. In the case of the two stage compressor, it is general that theoretical suction capacities of the main compressing element 802 and the auxiliary compressing element 803 are set different from each other.

PRIOR ART DOCUMENT

Patent Document

[Patent Document 1] Japanese Patent Application Laid-open No. S59-150991

SUMMARY OF THE INVENTION

Problem to be Solved by the Invention

However, in the conventional cycle device, at the time of the full operation in which capacity is not controlled (at the time of the high capacity mode of compressor), refrigerants which respectively come out from the compressing elements 802 and 803 respectively pass through the discharging pipes 804 and 805, the refrigerants merge with each other in the high pressure gas pipe 806, and flow to the condenser 807, the decompressor 809 and the evaporator 810. To prevent leakage during lubricating operation and compressing operation, oil is mixed in refrigerants which come out from the compressing elements 802 and 803, but since the discharging pipes 804 and 805 merge with each other outside a chamber 818, the refrigerant and the oil can not be separated from each other in the chamber 818. Therefore, the oil mixed in the refrigerant flows from the high pressure gas pipe 806 to the condenser 807, the decompressor 809 and the evaporator 810 together with the refrigerant. As a result, efficiencies of the condenser 807 and the evaporator 810 are largely deteriorated.

In view of these circumstances, it is an object of the present invention to provide a refrigeration cycle device capable of varying capacity efficiently.

Means for Solving the Problem

That is, the present invention provides a refrigeration cycle device including a compressor, a high pressure gas pipe, a condenser, a high pressure liquid pipe, a decompressor, an evaporator and a low pressure gas pipe, wherein the compressor includes an oil reservoir, an electric motor connected to a shaft and a compressing mechanism all accommodated in a hermetic container, a first cylinder and a second cylinder are provided on both end surfaces of an intermediate plate of the compressing mechanism, the refrigeration cycle device further includes a first frame and a second frame which rotatably hold the shaft, a first piston disposed in the first cylinder, a first compressing mechanism having a first operation chamber formed between the first frame and an inner peripheral surface of the first cylinder and also having a first vane which divides the first operation chamber into a first suction chamber and a first compression-discharge chamber, a second piston disposed in the second cylinder, and a second compressing mechanism having a second operation chamber formed between the second frame and an inner peripheral surface of the second cylinder and also having a second vane which divides the second operation chamber into a second suction chamber and a second compression-discharge chamber, the refrigeration cycle device further includes a first suction path for guiding working fluid into the first operation chamber, a second suction path for guiding working fluid into the second operation chamber, an inner space which is provided in the hermetic container and which is defined by an interior of the hermetic container, the first operation chamber and the second operation chamber, a communication path between the inner space and outside of the hermetic container, a first discharge port which is provided in the first frame and which makes compressed working fluid flow from the first operation chamber into the hermetic container, a first check valve which prohibits working fluid passing through the first discharge port from returning from the hermetic container into the first discharge port, a second discharge port which is provided in the second frame and which makes compressed working fluid flow out from the second operation chamber into the hermetic container, a second check valve which prohibits working fluid passing through the second discharge port from returning from the inner space into the second discharge port, a third discharge port which makes working fluid flow out from the inner space into the hermetic container, and a third check valve which prohibits working fluid passing through the third discharge port from returning from the hermetic container into the third discharge port, the low pressure gas pipe and the second suction path are connected to each other, and the refrigeration cycle device further includes a control element which selectively connects the first suction path to one of the communication path and the low pressure gas pipe.

Effect of the Invention

According to the present invention, in a refrigeration cycle device which varies capacity, at the time of a high capacity mode in which a first compressing mechanism and a second compressing mechanism are operated parallelly, all of refrigerants which flow out from the first compressing mechanism and the second compressing mechanism are introduced into a hermetic container. After a refrigerant and oil are separated from each other in the hermetic container, the refrigerant can be discharged to outside of the hermetic container. Therefore, efficiencies of the condenser and the evaporator are not deteriorated. As a result, it is possible to provide a capacity-control refrigeration cycle device capable of varying capacity efficiently.

Further, according to the invention, it is possible to reduce an amount of oil taken outside of the hermetic container at the time of the high capacity mode in which the first compressing mechanism and the second compressing mechanism are operated parallelly. Therefore, it is possible to stably secure oil and to prevent bite of parts of the compressing mechanism and to prevent abnormal wearing.

Figure 1:
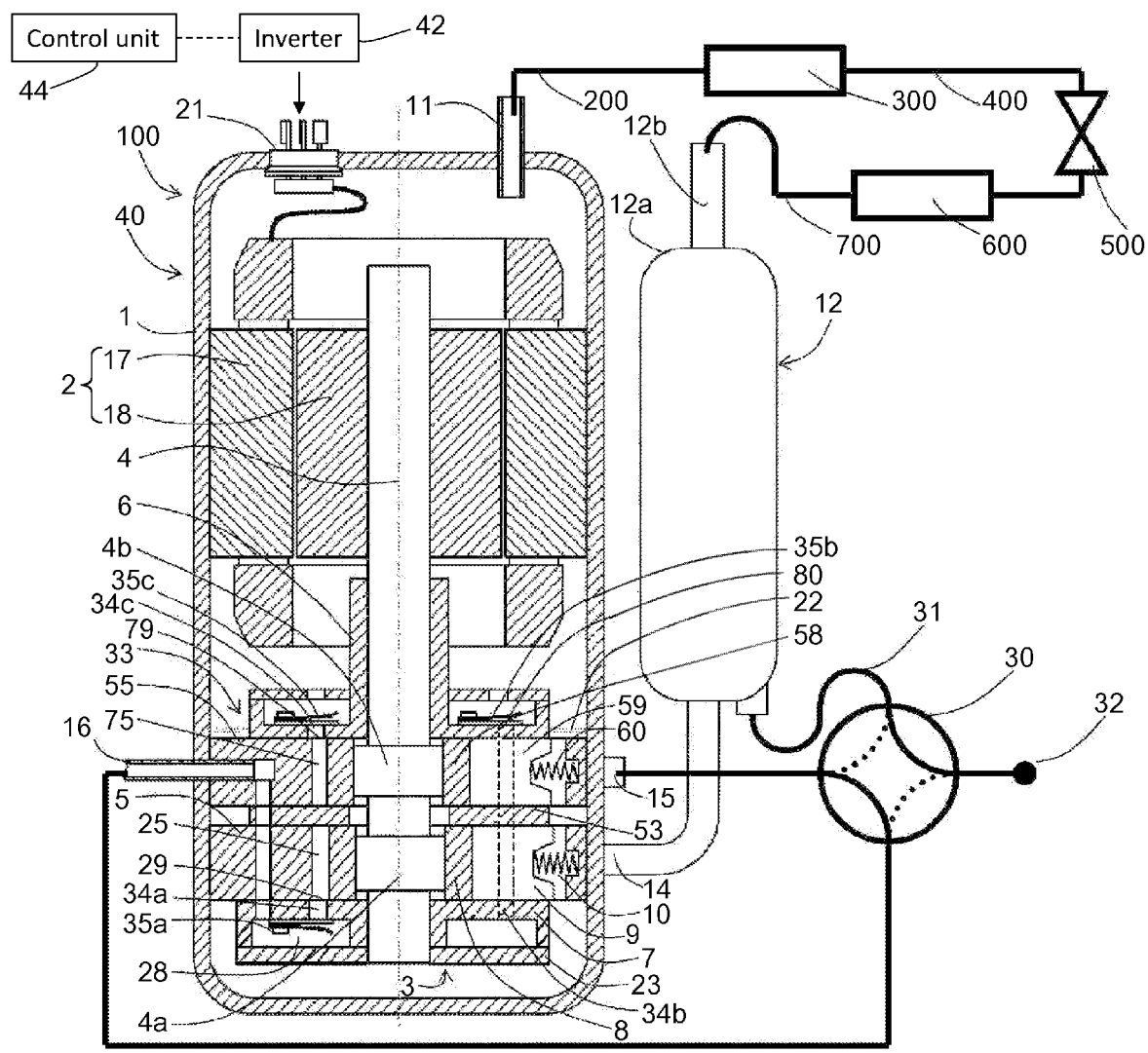
FIG. 1 is a vertical sectional view of a refrigeration cycle device and a compressor at the time of a high capacity mode according to an embodiment of the present invention.

EXPLANATION OF SYMBOLS 1 hermetic container
2 motor
3 first compressing mechanism
4 shaft
5 first cylinder
6 upper frame (second frame)
7 lower frame (first frame)
8 first piston
9 first vane
10 first spring
11 discharge path
12 accumulator
14 first suction path
15 second suction path 16 communication path
22 oil reservoir
25 first operation chamber
28 inner space
29 first discharge port
30 four-way valve (control element)
33 second compressing mechanism
31 connection pipe
32 seal space
34a first passage
34b third passage
34c second passage
35a first check valve
35b third check valve
35c second check valve
40 compressor body
42 inverter
44 control unit
53 intermediate plate
55 second cylinder
58 second piston
59 second vane
60 second spring
75 second operation chamber
79 second discharge port
80 third discharge port
100 compressor
200 high pressure gas pipe
300 condenser
400 high pressure liquid pipe
500 decompressor
600 evaporator
700 low pressure gas pipe

MODE FOR CARRYING OUT THE INVENTION

Figure 2:
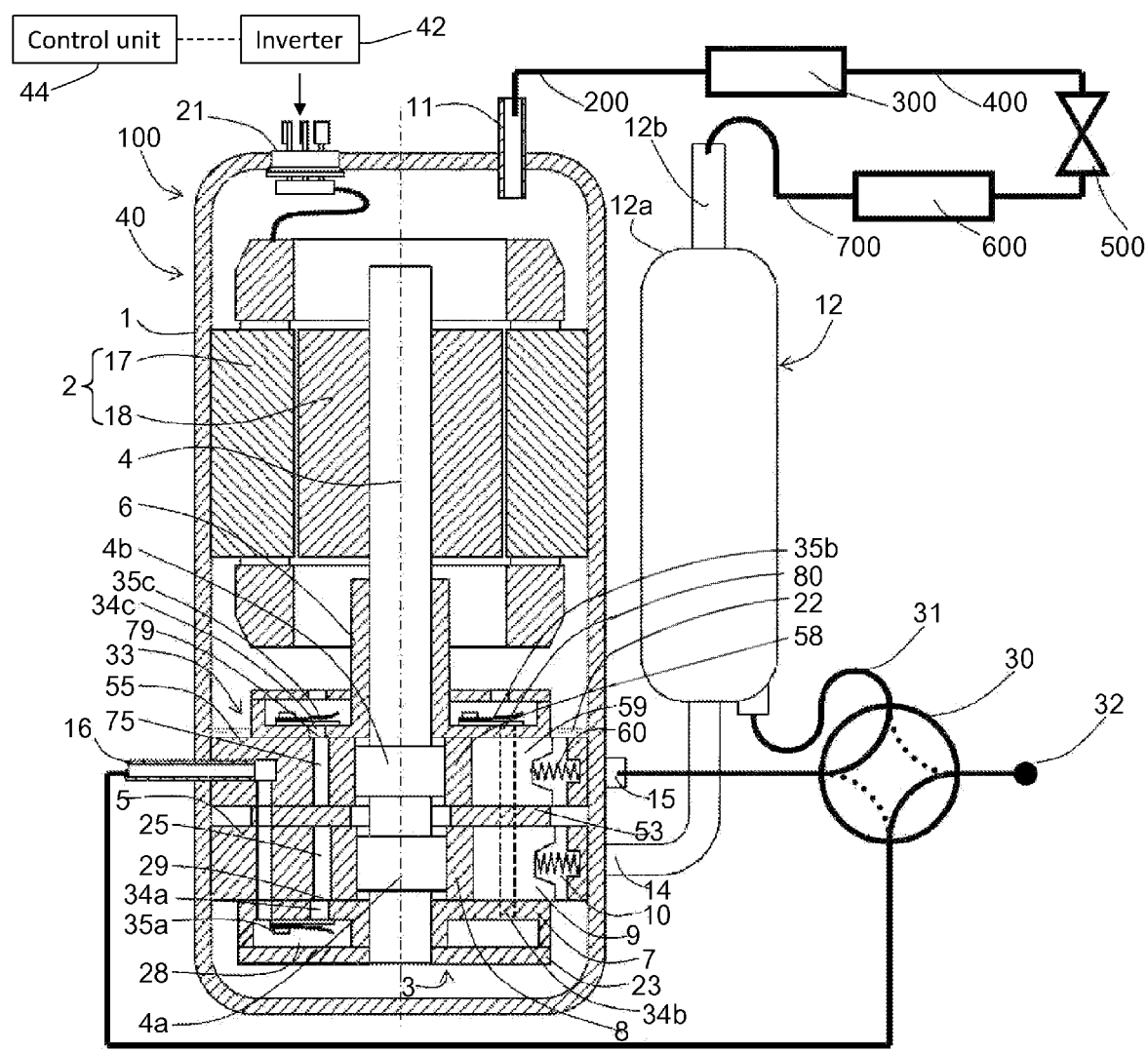
FIG. 2 is a vertical sectional view of the refrigeration cycle device and the compressor at the time of low capacity mode according to the embodiment.

FIGS. 1 and 2 show a refrigeration cycle device according to an embodiment of the present invention.

As shown in FIGS. 1 and 2, the refrigeration cycle device of the embodiment includes a compressor 100, a high pressure gas pipe 200, a condenser 300, a high pressure liquid pipe 400, a decompressor 500, an evaporator 600 and a low pressure gas pipe 700.

A compressor body 40 has a hermetic container 1, and the hermetic container 1 is provided therein with a motor 2, a first compressing mechanism 3, a second compressing mechanism 33 and a shaft 4. The first compressing mechanism 3 and the second compressing mechanism 33 are disposed at lower locations in the hermetic container 1. The motor 2 is disposed above the first compressing mechanism 3 and the second compressing mechanism 33. The first compressing mechanism 3, the second compressing mechanism 33 and the motor 2 are connected to the shaft 4. An upper portion of the hermetic container 1 is provided with a terminal 21 which supplies electricity to the motor 2. An oil reservoir 22 for holding lubricating oil is formed in a bottom of the hermetic container 1. The compressor body 40 has a structure of a so-called hermetical type compressor.

The first compressing mechanism 3 and the second compressing mechanism 33 are positive-displacement fluid mechanisms.

The first compressing mechanism 3 is composed of a first cylinder 5, a first piston 8, a first vane 9, a first spring 10 a lower frame (first frame) 7 and an intermediate plate 53. The first piston 8 is disposed in the first cylinder 5. The first piston 8 is fitted over a first eccentric portion 4a of the shaft 4. A first operation chamber 25 is formed between an outer peripheral surface of the first piston 8 and an inner peripheral surface of the first cylinder 5. A first vane groove (not shown) is formed in the first cylinder 5. The first vane 9 and the first spring 10 are accommodated in the first vane groove. A tip end of the first vane 9 comes into contact with the outer peripheral surface of the first piston 8. The first vane 9 is pushed by the first spring 10 toward the first piston 8. The lower frame 7 is disposed on a lower surface of the first cylinder 5, and the intermediate plate 53 is disposed on an upper surface of the first cylinder 5. The first cylinder 5 is sandwiched between the lower frame 7 and the intermediate plate 53. The first operation chamber 25 is partitioned by the first vane 9 to form a first suction chamber and a first compression-discharge chamber.

The second compressing mechanism 33 is composed of a second cylinder 55, a second piston 58, a second vane 59, a second spring 60, an upper frame (second frame) 6 and an intermediate plate 53. The second cylinder 55 is coaxially disposed with the first cylinder 5. The second piston 58 is disposed in the second cylinder 55. A second operation chamber 75 is formed between an outer peripheral surface of the second piston 58 and an inner peripheral surface of the second cylinder 55. The second piston 58 is fitted over the second eccentric portion 4b of the shaft 4. A second vane groove (not shown) is formed in the second cylinder 55. The second vane 59 and the second spring 60 are accommodated in the second vane groove. A tip end of the second vane 59 comes into contact with the outer peripheral surface of the second piston 58. The second vane 59 is pushed by the second spring 60 toward the second piston 58. The upper frame 6 is disposed on a lower surface of the second cylinder 55, and the intermediate plate 53 is disposed on an upper surface of the second cylinder 55. The second cylinder 55 is sandwiched between the upper frame 6 and the intermediate plate 53. The second operation chamber 75 is partitioned by the second vane 59 to form a second suction chamber and a second compression-discharge chamber.

A projecting direction of the first eccentric portion 4a is deviated from a projecting direction of the second eccentric portion 4b by 180°. A phase of the first piston 8 is deviated from a phase of the second piston 58 by a rotation angle of the shaft 4 of 180°.

The lower frame 7 is provided with an inner space 28. The inner space 28 is defined by an interior of the hermetic container 1, the first operation chamber 25 and the second operation chamber 75. A refrigerant (working fluid) compressed by the first compressing mechanism 3 is introduced into the first suction chamber of the first operation chamber 25 through a first suction path 14. A refrigerant discharged from the first compression-discharge chamber of the first operation chamber 25 flows out into the inner space 28 from a first discharge port 29 formed in the lower frame 7.

A first passage 34a is formed between the first discharge port 29 and the inner space 28. The inner space 28 and the first discharge port 29 are in communication with each other through a first passage 34a. The first passage 34a is provided with a first check valve 35a. The first check valve 35a prevents a refrigerant from flowing into the first operation chamber 25 from the inner space 28. A third passage 34b and a third discharge port 80 are formed between the inner space 28 and an interior of the hermetic container 1. The third discharge port 80 is formed in the upper frame 6. The inner space 28 and the interior of the hermetic container 1 are in communication with each other through the third passage 34b and the third discharge port 80. The third discharge port 80 is provided with a third check valve 35b. The third check valve 35b prevents a refrigerant from flowing into the inner space 28 from the interior of the hermetic container 1.

A refrigerant compressed by the second compressing mechanism 33 is introduced into the second suction chamber of the second operation chamber 75 through a second suction path 15. A refrigerant discharged from the second compression-discharge chamber of the second operation chamber 75 is introduced into the interior of the hermetic container 1 from a second discharge port 79. The second discharge port 79 is formed in the upper frame 6. A second passage 34c is formed between the second discharge port 79 and the interior of the hermetic container 1. The second discharge port 79 and the interior of the hermetic container 1 are in communication with each other through the second passage 34c. The second passage 34c is provided with a second check valve 35c. The second check valve 35c prevents a refrigerant from flowing into the second operation chamber 75 from the interior of the hermetic container 1.

A discharge path 11, the first suction path 14, the second suction path 15 and a communication path 16 are composed of refrigerant pipes. The discharge path 11 penetrates an upper portion of the hermetic container 1. A compressed refrigerant is guided to outside of the hermetic container 1 through the discharge path 11. The discharge path 11 is connected to the high pressure gas pipe 200 to supply a high pressure refrigerant to the condenser 300. The first suction path 14 connects the first compressing mechanism 3 and an accumulator 12 to each other. The first suction path 14 guides a refrigerant to be compressed from the accumulator 12 to the first operation chamber 25 of the first compressing mechanism 3.

The second suction path 15 connects the second compressing mechanism 33 and a four-way valve 30 as a control element to each other. The communication path 16 connects the inner space 28 and the four-way valve 30 to each other. One end of the second suction path 15, one end of the communication path 16, one end of a connection pipe 31 connected to the accumulator 12 and one end of a pipe connected to a seal space 32 are connected to the four-way valve 30.

The accumulator 12 is composed of a storage container 12a and an introduction pipe 12b. The storage container 12a includes an inner space in which a liquid refrigerant and a gas refrigerant can be held. The introduction pipe 12b is provided on an upper portion of the storage container 12a. The introduction pipe 12b is connected to the low pressure gas pipe 700 and a low pressure refrigerant is supplied to the introduction pipe 12b from the evaporator 600. The first suction path 14 and the connection pipe 31 penetrate a bottom of the storage container 12a and are connected to the accumulator 12. The first suction path 14 and the connection pipe 31 upwardly extend from the bottom of the storage container 12a by certain heights. The connection pipe 31 and the first suction path 14 are connected to each other through the inner space of the accumulator 12. An interior of the storage container 12a may be provided with other member such as a baffle so that a liquid refrigerant does not flow from the introduction pipe 12b to the first suction path 14. The connection pipe 31 may be connected directly to the first suction path 14 or the introduction pipe 12b.

According to the embodiment, it is possible to switch, by using the four-way valve 30, between operation of a refrigeration cycle at the time of the full operation (at the time of high capacity mode of compressor) in which capacity is not controlled and a case in which a load is reduced and capacity is controlled (at the time of low capacity mode of compressor). This will be described specifically below.

The case in which a load of the refrigeration cycle device is reduced and capacity is controlled (at the time of low capacity mode of compressor) will be described.

As shown in FIG. 1, the second suction path 15 and the communication path 16 are connected to each other and the connection pipe 31 and the seal space 32 are connected to each other by means of the four-way valve 30. In this case, since only the first suction path 14 is connected to the accumulator 12, the first compressing mechanism 3 and the second compressing mechanism 33 are connected to each other in series. At this time, the connection pipe 31 is connected to the seal space 32.

Next, flow of a refrigerant will be described specifically.

A refrigerant sucked from the first suction path 14 is compressed by the first compressing mechanism 3, passes through the first discharge port 29 and is discharged into the inner space 28. The communication path 16 which is in communication with the inner space 28 is connected to the second suction path 15 through the four-way valve 30. A refrigerant discharged into the inner space 28 is sucked from the second suction path 15 and then, the refrigerant is compressed by the second compressing mechanism 33, and is discharged into the interior of the hermetic container 1 through the second discharge port 79. Here, since the first compressing mechanism 3 and the second compressing mechanism 33 are connected to each other in series, a pressure in the inner space 28 becomes an intermediate pressure which is lower than a discharge pressure of the second compressing mechanism 33. Hence, the third check valve 35b is closed by a pressure difference between the inner space 28 and the interior of the hermetic container 1. As a result, all of the refrigerants compressed by the first compressing mechanism 3 flow into the second compressing mechanism 33. A refrigerant compressed by the second compressing mechanism 33 is discharged into the interior of the hermetic container 1 and is introduced to outside of the hermetic container 1 through the discharge path 11.

Here, it is preferable that heights of the first cylinder 5 and the second cylinder 55 are set different from each other, thereby varying suction capacity of the first compressing mechanism 3 and suction capacity of the second compressing mechanism 33. More specifically, when the suction capacity of the first compressing mechanism 3 is defined as V1 and the suction capacity of the second compressing mechanism 33 is defined as V2, it is preferable that the suction capacity V1 of the first compressing mechanism 3 is set greater than the suction capacity V2 of the second compressing mechanism 33, and the compressing operation is carried out in two stages so that a compression ratio on the low pressure-side and a compression ratio on the high pressure-side become equal to each other.

The full operation (at the time of high capacity mode of compressor) in which capacity of the refrigeration cycle device is not controlled will be described.

As shown in FIG. 2, the second suction path 15 and the connection pipe 31 are connected to each other and the communication path 16 and the seal space 32 are connected to each other by means of the four-way valve 30. In this case, since the first suction path 14 and the second suction path 15 are connected to the accumulator 12, the first compressing mechanism 3 and the second compressing mechanism 33 are connected to each other in parallel.

Next, flow of a refrigerant will be described specifically.

A refrigerant sucked from the first suction path 14 is compressed by the first compressing mechanism 3, passes through the first discharge port 29 and is discharged into the inner space 28. Since the communication path 16 which is in communication with the inner space 28 is connected to the seal space 32 through the four-way valve 30, a pressure in the inner space 28 rises to the same level as the interior of the hermetic container 1. As a result, the third check valve 35b opens and a refrigerant is discharged into the interior of the hermetic container 1 from the inner space 28. Since the second suction path 15 is connected to the accumulator 12 through the four-way valve 30, a refrigerant sucked from the second suction path 15 is compressed by the second compressing mechanism 33, and passes through the second discharge port 79 and is discharged into the interior of the hermetic container 1. Here, the first compressing mechanism 3 and the second compressing mechanism 33 are connected to each other in parallel, refrigerants compressed by the first compressing mechanism 3 and the second compressing mechanism 33 merge with each other in the hermetic container 1, the refrigerant passes through the discharge path 11 and is guided to outside of the hermetic container 1.

Here, the suction capacity in the high capacity mode can be expressed as V1+V2 if the suction capacity V1 of the first compressing mechanism 3 and the suction capacity V2 of the second compressing mechanism 33 are used. Suction capacity in low the capacity mode is V1.

Next, separation between a refrigerant and oil will be described.

Generally, the compressor 100 including the hermetic container 1 has a configuration that after a refrigerant is once discharged into the hermetic container 1, the refrigerant passes through the discharge path 11 and is guided to outside of the hermetic container 1. In this high pressure type compressor, an oil reservoir is included in the hermetic container 1 for preventing a refrigerant which is lubricating sliding portions of the compressing mechanism or which is being compressed from leaking. The compressor 100 used in the refrigeration cycle device in the embodiment also includes the oil reservoir 22 for preventing a refrigerant which is lubricating sliding portions of the compressing mechanism or which is being compressed from leaking.

A portion of oil introduced into the compressing mechanism is mixed with a refrigerant in the mid course of compressing operation, and the refrigerant and the oil are discharged together into the interior of the hermetic container 1. When the mixture fluid of the refrigerant and the oil discharged into the interior of the hermetic container 1 moves in the vicinity of the motor 2 or moves upward in the interior of the hermetic container 1, oil having greater specific gravity than that of the refrigerant is separated from the refrigerant by a centrifugal force or gravity, and the oil returns into the oil reservoir 22 in the interior of the hermetic container 1. In the case of the high pressure type compressor in which oil can be separated from a refrigerant in the hermetic container 1 due to the above-described action, since it is possible to reduce an amount of oil guided to outside of the hermetic container 1 through the discharge path 11, efficiencies of the condenser 300 and the evaporator 600 are not deteriorated. As a result, it is possible to provide a refrigeration cycle device which can be operated efficiently.

According to the embodiment, in both the operation modes, i.e., the full operation mode (at the time of high capacity mode of compressor) in which capacity is not controlled and the operation mode in which a load of the refrigeration cycle device is reduced and capacity is controlled (at the time of low capacity mode of compressor), all of refrigerants are discharged into the interior of the hermetic container 1 and then, the refrigerants pass through the discharge path 11 and are guided to outside of the hermetic container 1. As a result, after the refrigerant and the oil are sufficiently separated from each other in the hermetic container 1, the refrigerant can be discharged to outside of the hermetic container 1. Therefore, efficiencies of the condenser 300 and the evaporator 600 are not deteriorated. As a result, it is possible to provide a capacity-control refrigeration cycle device capable of efficiently varying capacity. Further, since it is possible to reduce an amount of oil taken outside of the hermetic container 1, it is possible to stably secure the oil in the oil reservoir 22, to prevent bite of parts of the compressing mechanism and to prevent abnormal wearing.

In the embodiment, the first compressing mechanism 3 is disposed on a side far from the motor 2, and the second compressing mechanism 33 is disposed on a side close to the motor 2. That is, the motor 2, the second compressing mechanism 33 and the first compressing mechanism 3 are arranged in this order along an axial direction of the shaft 4. By configuring these members in this order, it is possible to configure the third discharge port 80 on the upper frame 6 as shown in FIGS. 1 and 2.

Figure 3:
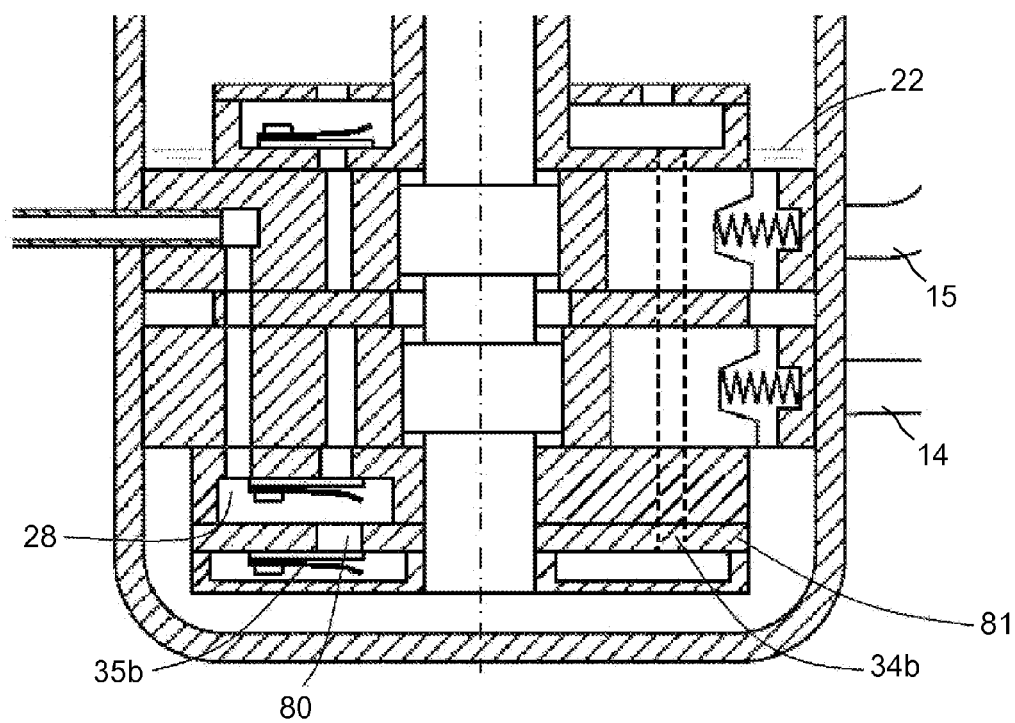
FIG. 3 is a vertical sectional view of essential portion of the compressor when a third discharge port is configured in a lower frame.
Figure 4:
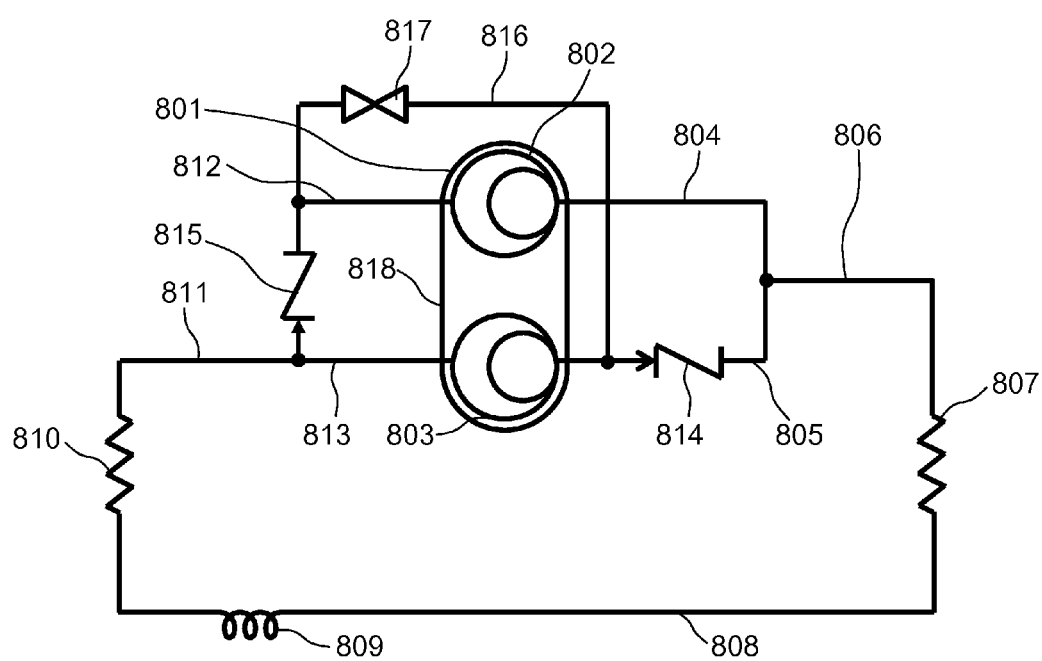
FIG. 4 shows a configuration of a conventional capacity-control refrigeration cycle.

FIG. 3 shows a compressor when the third discharge port is configured on the side of the lower frame. If the third discharge port 80 is configured on the side of the lower frame 7, a refrigerant is discharged directly into the oil reservoir 22 and the refrigerant and oil are mixed. To avoid this, it is necessary to form the third passage 34b for guiding the refrigerant to an upper portion of the hermetic container 1. Hence, to form the third discharge port 80, it is necessary to newly dispose a plate 81. As a result, the number of parts and the number of working processes are increased.

If the first compressing mechanism 3 is disposed on the side close to the motor 2 and the second compressing mechanism 33 is disposed on the side far from the motor 2 (this configuration is not shown), the inner space 28 is formed on the side of the upper frame 6, but to configure the inner space 28, it is necessary to newly dispose the plate 81 like the above example. As a result, the number of parts and the number of working processes are increased.

In the embodiment, the first compressing mechanism 3 is disposed on the side far from the motor 2 and the second compressing mechanism 33 is disposed on the side close to the motor 2. That is, the motor 2, the second compressing mechanism 33 and the first compressing mechanism 3 are arranged in this order along the axial direction of the shaft 4. By configuring these members in this order, the third discharge port 80 can be configured on the upper frame 6. As a result, since the number of parts and the number of working processes are not increased, it is possible to provide a capacity-control refrigeration cycle device capable of inexpensively and efficiently varying capacity.

In this embodiment, the second discharge port 79 and the third discharge port 80 are located higher than a liquid level in the oil reservoir 22. It is possible to avoid a case where a refrigerant is discharged directly into the oil reservoir 22 and the refrigerant and oil are mixed. As a result, it is possible to further reduce an amount of oil which is guided to outside of the hermetic container 1 through the discharge path 11 and therefore, efficiencies of the condenser and the evaporator are not deteriorated. As a result, it is possible to provide a capacity-control refrigeration cycle device capable of more efficiently vary capacity.

The first vane 9 and the second vane 59 may integrally be formed on the first piston 8 and the second piston 58. That is, when the first piston 8 and the first vane 9, and the second piston 58 and the second vane 59 may be configured as so-called swing-type pistons, or the first piston 8, the first vane 9, the second piston 58 and the second vane 59 may be jointed to each other.

Each of the first check valve 35a, the second check valve 35c and the third check valve 35b is configured as a reed valve which is composed of a reed portion and a valve stop portion.

Another example of the check valve is a free valve which is composed of a valve body, a guide and a spring. The free valve is characterized in that a pressure loss when working fluid passes can be made smaller than that of the reed valve, but the free valve has a problem that the valve body collides against the guide until the valve body closes a passage and noise is generated. However, in the case of the third check valve 35b which prevents a refrigerant from flowing into the inner space 28 from the interior of the hermetic container 1, since a pressure difference between the interior of the hermetic container 1 and the inner space 28 and its pulsing motion are small at the time of the high capacity mode, the free valve may be used as the third check valve 35b (this example is not shown).

The motor 2 is composed of a stator 17 and a rotor 18. The stator 17 is fixed to an inner peripheral surface of the hermetic container 1. The rotor 18 is fixed to the shaft 4 and rotates together with the shaft 4. The first piston 8 and the second piston 58 are moved by the motor 2 in the first cylinder 5 and the second cylinder 55. As the motor 2, it is possible to use a motor which can change the number of revolutions such as an IPMSM (Interior Permanent Magnet Synchronous Motor) and an SPMSM (Surface Permanent Magnet Synchronous Motor).

A control unit 44 controls an inverter 42 and adjusts the number of revolutions of the motor 2, i.e., the number of revolutions of the compressor 100. As the control unit 44, it is possible to use a DSP (Digital Signal Processor) including an A/D converting circuit, an input/output circuit, a calculation circuit and a storage device. A relation between a high capacity mode and a low capacity mode of the inverter 42 and the capacity-control refrigeration cycle device will be described below.

Specifically, the suction capacity V1 of the first compressing mechanism 3 is set to 10 cc and the suction capacity V2 of the second compressing mechanism 33 is set to 8 cc, and assume that when the number of revolutions of the compressor 100 is 60 Hz at the time of the high capacity mode, the rated ability of the refrigeration cycle device is exerted.

First, an example of operation for setting ability of the refrigeration cycle device to 70% with respect to rated ability will be described. According to the embodiment, if the mode is switched to the low capacity mode, the suction capacity of the compressor 100 becomes 10 cc. As a result, in order to set the ability of the refrigeration cycle device to 70% with respect to the rated ability, it is necessary to set the number of revolutions of the compressor 100 to (18 cc/10 cc×60 Hz)× 0.7=75.6 Hz in the low capacity mode. When the motor 2 is driven at a arbitrary number of revolutions by the inverter 42 on the other hand, the ability can be set to 70% by setting the number of revolutions of the motor 2 to 70% (=42 Hz) with respect to the rated number of revolutions of 60 Hz. Most of motors 2 are designed such that the highest efficiency is exerted at the number of revolutions in the vicinity of the rated number of revolutions, but if the motor 2 is operated at the number of revolutions of about 70%, high efficiency can be maintained. As a result, if an inverter 42 which drives the motor 2 at an arbitrary number of revolutions is used, it is possible to operate the refrigeration cycle device efficiently.

Next, an example of operation for setting the ability of the refrigeration cycle device to 50% will be described. According to the embodiment, when the mode is switched to the low capacity mode, the suction capacity of the compressor 100 becomes 10 cc. As a result, to set the ability of the refrigeration cycle device to 50%, it is necessary to set the number of revolutions of the compressor 100 to (18 cc/10 cc×60 Hz)× 0.5=54 Hz in the low capacity mode. When the motor 2 is driven at an arbitrary number of revolutions by the inverter 42, the ability can be set to 50% by operating the motor 2 at the number of revolutions of 50% (=30 Hz) with respect to the rated number of revolutions of 60 Hz. Most of motors 2 are designed such that high efficiency is exerted at the number of revolutions in the vicinity of the rated number of revolutions, but if the motor is operated at the number of revolutions of about 50%, efficiency is largely deteriorated. As a result, if the motor is operated in the low capacity mode, the refrigeration cycle device can be operated efficiently.

As described above, concerning a relation between a case where the high capacity mode and the low capacity mode of the capacity-control refrigeration cycle device are switched and the inverter 42 in which the motor 2 is driven at an arbitrary number of revolutions, if a case where the refrigeration cycle device can be operated efficiently is selected, it is possible to operate the refrigeration cycle device more efficiently.

In the embodiment, when the ability of the refrigeration cycle device is set to 70%, the inverter 42 which drives the motor 2 at an arbitrary number of revolutions is selected, and when the ability of the refrigeration cycle device is set to 50%, the low capacity mode of the capacity-control refrigeration cycle device is selected, but the invention is not limited to the embodiment. Concerning the selection between the case where the high capacity mode and the low capacity mode of the capacity-control refrigeration cycle device are switched and the case using the inverter 42 for driving the motor 2 at an arbitrary number of revolutions, one of them which can operate the refrigeration cycle device more efficiently should be selected.

Further, an example of operation for setting the ability of the refrigeration cycle device to 10% will be described. When the motor 2 is driven at arbitrary number of revolutions of the inverter 42, if the motor 2 is operated at the number of revolutions of about 10% (=6 Hz) with respect to the rated number of revolutions of 60 Hz, sufficient oil is not supplied to sliding portions of various parts of the compressing mechanism, bite and abnormal wearing are generated, and the compressor 100 is operated in an intermittent manner, i.e., the compressor 100 repeats suspension and operation of about 10 Hz, and efficiency thereof is largely deteriorated. However, if the low capacity mode of the capacity-control refrigeration cycle device is used, the number of revolutions of the compressor 100 can be set to (18 cc/10 cc×60 Hz)×0.1=10.8 Hz and therefore, even if ability is small, it is possible to operate the rotary compressor more efficiently while securing high reliability.

INDUSTRIAL APPLICABILITY

The present invention is effective for a compressor of a refrigeration cycle device which can be utilized for a water heater, a hydronic heater and an air conditioner. The invention is especially effective for a compressor of an air conditioner which is required to have wide ability.

The invention claimed is:
1. A refrigeration cycle device comprising a compressor, a high pressure gas pipe, a condenser, a high pressure liquid pipe, a decompressor, an evaporator and a low pressure gas pipe, wherein
the compressor includes an oil reservoir, an electric motor and a compressing mechanism all accommodated in a hermetic container,
the electric motor and the compressing mechanism are connected to each other through a shaft, a first cylinder and a second cylinder are provided on both end surfaces of an intermediate plate of the compressing mechanism, the refrigeration cycle device further comprises a first frame and a second frame which rotatably hold the shaft, the compressing mechanism is composed of a first compressing mechanism disposed between the first frame and the intermediate plate, and a second compressing mechanism disposed between the second frame and the intermediate plate, the first compressing mechanism is composed of the first cylinder, a first piston disposed in the first cylinder, the first frame, and the intermediate plate, a first operation chamber is formed between an inner peripheral surface of the first cylinder and the first piston, the second compressing mechanism is composed of the second cylinder, a second piston disposed in the second cylinder, the second frame and the intermediate plate, a second operation chamber is formed between an inner peripheral surface of the second cylinder and the second piston, the refrigeration cycle device further comprises a first suction path for guiding working fluid into the first operation chamber, a second suction path for guiding working fluid into the second operation chamber, an inner space which is provided in the hermetic container and which is defined by an interior of the container, the first operation chamber and the second operation chamber, a communication path for guiding working fluid in the inner space to outside of the hermetic container, a first discharge port which is provided in the first frame and through which working fluid compressed in the first operation chamber flows out into the hermetic container, a first check valve which prevents working fluid passing through the first discharge port from returning from the hermetic container into the first discharge port, a second discharge port which is provided in the second frame and through which working fluid compressed in the second operation chamber flows out into the hermetic container, a second check valve which prevents working fluid passing through the second discharge port from returning from the container into the second discharge port, a third discharge port through which working fluid flows out from the inner space into the hermetic container, and a third check valve which prevents working fluid passing through the third discharge port from returning from the hermetic container into the third discharge port, the low pressure gas pipe and the second suction path are connected to each other, and the refrigeration cycle device further comprises a four-way valve which selectively connects the first suction path to one of the communication path and the low pressure gas pipe, one end of the second suction path, one end of the communication path, one end of a connection pipe connected to the accumulator and one end of a pipe connected to a seal space are connected to the four-way valve, the accumulator is composed of a storage container and an introduction pipe, the first suction path and the connection pipe penetrate a bottom of the storage container and upwardly extend from the bottom of the storage container by certain heights, and the connection pipe and the first suction path are connected to each other through the inner space of the accumulator.

2. The refrigeration cycle device according to claim 1, wherein the suction capacity of the first compressing mechanism is set greater than the suction capacity of the second compressing mechanism.

3. The refrigeration cycle device according to claim 1, wherein the second frame is provided with the third discharge port.

4. The refrigeration cycle device according to claim 1, wherein the second discharge port and the third discharge port are located higher than a liquid level in the oil reservoir.

5. The refrigeration cycle device according to claim 1, further comprising an inverter which drives the electric motor at an arbitrary number of revolutions, and a control unit which controls the inverter.

* * * * *